Jan. 27, 1948. W. E. BRADLEY 2,435,029
PROCESS FOR ALKYLATION OF ISOPARAFFINS WITH OLEFINS
Filed Jan. 3, 1939
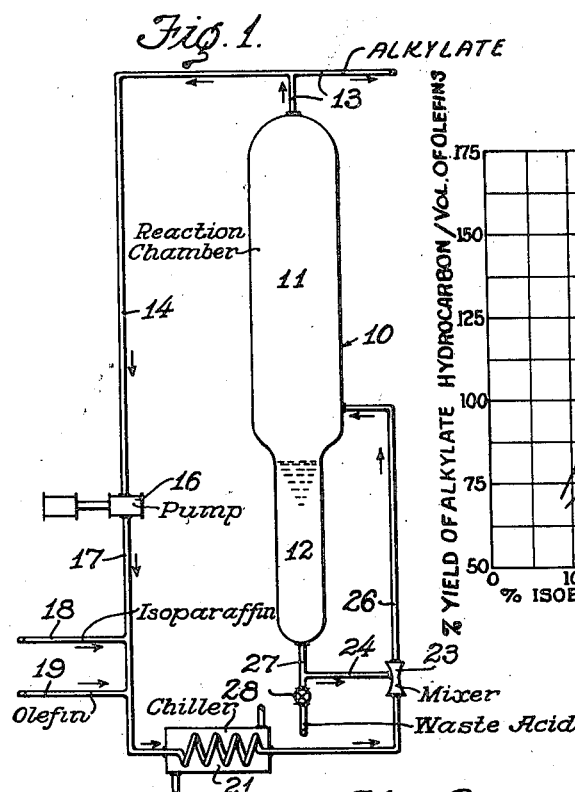
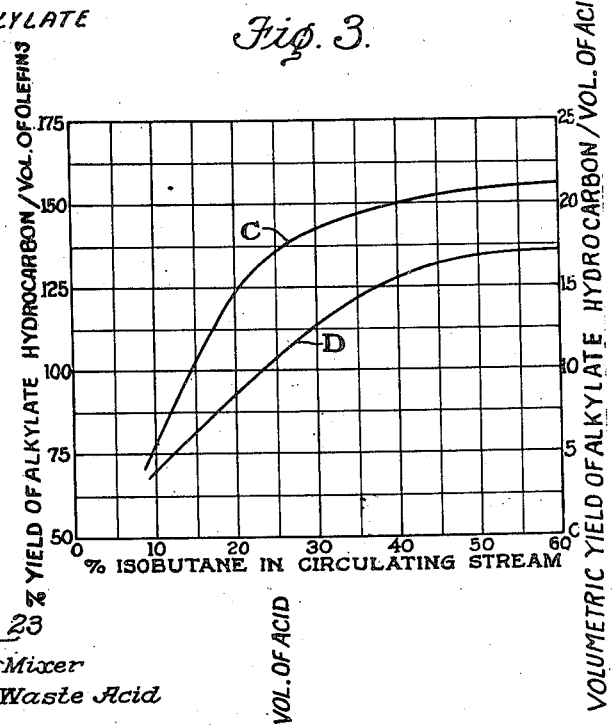
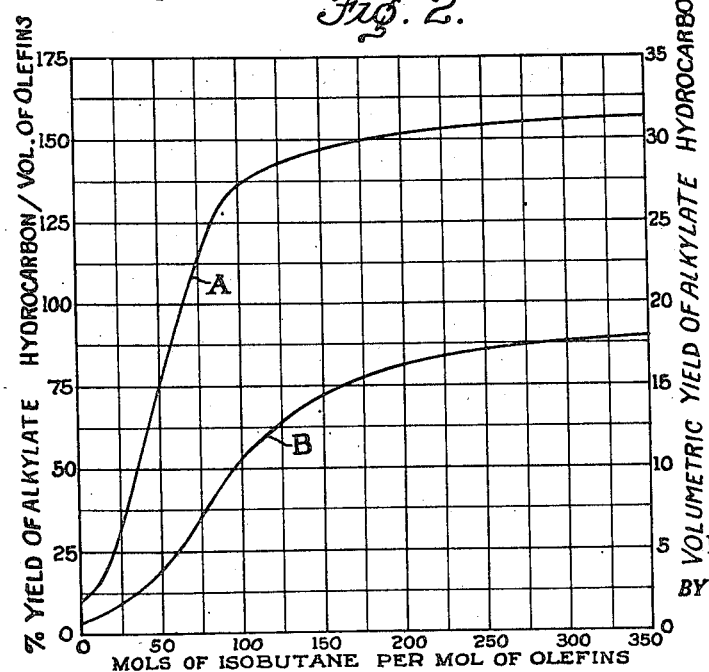
INVENTOR
William E. Bradley
BY Philip Subkow
ATTORNEY.

Patented Jan. 27, 1948

2,435,029

UNITED STATES PATENT OFFICE 2,435,029

PROCESS FOR ALKYLATION OF ISO-PARAFFINS WITH OLEFINS

William E. Bradley, Los Angeles, Calif., assignor to Union Oil Company of California, Los Angeles, Calif., a corporation of California Application January 3, 1939, Serial No. 248,928

22 Claims. (Cl. 260—683.4)

The present invention relates to the synthesis of hydrocarbons and more particularly pertains to the manufacture of hydrocarbons having branched chain structures and which are especially suitable as automobile and aviation engine fuels or as constituents thereof. This application is a continuation-in-part of my copending application, Serial No. 218,772, filed July 12, 1938.

More specifically, the invention concerns a process for reacting certain isoparaffinic hydrocarbons with olefins to produce high yields of branched chain paraffinic hydrocarbons possessing high anti-detonating or slow burning characteristics and boiling within the gasoline range, these hydrocarbons being substantially free from products of polymerization. In one of its specific embodiments, the invention includes a continuous process for the combining of relatively low molecular weight isoparaffinic hydrocarbons with olefins, which may be normally gaseous or normally liquid or both, to produce high yields of the above described branched chain paraffinic hydrocarbons.

It has been recently discovered that the relatively low molecular weight isoparaffins, such as isobutane, isopentane, and, to some degree, isohexane, may be chemically combined with olefins to produce the desired branched chain hydrocarbons boiling within the gasoline range and possessing the required high anti-detonating characteristics. Such reactions are termed "alkylation" in order to distinguish them from "polymerization" reactions, which consist in the combining of two or more olefinic molecules to form an olefin of proportionately higher molecular weight. It has also been previously discovered that such alkylation reactions between the isoparaffins and olefins may be effected catalytically at atmospheric or elevated pressures and at atmospheric or even subatmospheric temperatures. Furthermore, it has been previously discovered that substances of the type of sulfuric acid, mixtures of sulfuric and phosphoric acids, chlorosulfonic acid and certain complexes of aluminum chloride and/or boron trifluoride, may be effectively employed as the catalyst for such chemical combining of isoparaffins with olefins to produce the described branched chain paraffinic hydrocarbons boiling within the gasoline range and having high anti-detonating characteristics.

Since the catalysts suitable for the alkylation reactions between isoparaffins and olefins are also active promoters for the polymerization of the olefins, and because of the greater reactivity of the olefins as compared to that of the isoparaffins, the interaction of isoparaffins with olefins is generally accompanied by a certain amount of polymerization of the olefins. In an attempt to prevent this concurrent polymerization as well as to inhibit other undesirable secondary reactions, it has been the general practice heretofore to effect catalytic alkylation reactions by commingling the olefins with a relatively small excess of isoparaffins and subsequently contacting the mixture with the catalyst. Thus, according to French Patent 823,593 to Universal Oil Products Company, butylenes are caused to react with isobutane in a continuous process and in the presence of a catalyst consisting of aluminum chloride and hydrogen chloride, the patent stating that optimum yields of alkylates may be obtained when the ratio of isobutane to butylene is about 3:1. Also, British Patent 479,345 to the Anglo Iranian Oil Company discloses a batch alkylating process in which the isobutane is mixed with sulfuric acid and an olefinic material is slowly added over a period of time. The patent indicates that optimum yields of alkylate are obtained by terminating the olefin addition when the ratio of isobutane to the olefins thus added is about 4:1 on a weight basis. More recently, and according to the invention covered by the above referred to copending application, Serial No. 218,772, it has been found that it is possible to increase the yield of alkylate and to decrease the polymerization of the olefins by conducting the alkylation reaction in the presence of an inert diluent. According to this invention the olefins are first dissolved in the inert diluent thus forming a relatively dilute solution of the olefins. Thereafter, the prediluted olefins thus obtained are caused to react with isoparaffins by contacting the mixture with the desired alkylating catalyst such as strong sulfuric acid. By operating according to the process described, it is possible to increase the yield of alkylate per unit of catalyst employed as compared to the alkylate yield obtainable by a process in which the isoparaffins and olefins are commingled and subsequently contacted with an alkylation catalyst. As stated in the above copending application, it has been found that the reaction product obtained by the interaction of olefins with isobutane in quantities in excess of those necessary to combine with the olefins is a suitable diluent for the olefinic material.

It is the main object of the present invention to provide an improved process whereby high yields of products of alkylation may be obtained by the catalytic interaction of isoparaffins with olefins. It is a further object of the invention to provide an improved process for the alkylation of isoparaffins with olefins to produce relatively high yields of branched chain paraffinic hydrocarbons of the class described, these products of reaction being substantially free from products of polymerization of the olefins. It is a still further object of the invention to provide a process for reacting isoparaffins with olefins in substantially the liquid phase at ordinary or elevated pressures and at atmospheric or subatmospheric temperatures, and in the presence of an alkylating catalyst of the type of sulfuric acid under conditions whereby greater yields of products of reaction are obtainable, these products of reaction comprising branched chain paraffinic hydrocarbons boiling within the gasoline range and being substantially free from products of polymerization.

It has now been discovered that the above and other objects may be attained by providing a continuous alkylation process in which a portion of the products of reaction is continuously recycled through the reaction zone, and wherein a relatively high ratio of isoparaffinic to olefinic materials is maintained in such reaction zone. It has been further discovered that optimum yields of alkylate may be obtained by controlling the recirculation of the reaction products and the rate of addition of the olefinic material and of the isoparaffins so as to maintain the ratio between the isoparaffinic and olefinic materials within a fairly well defined range which is considerably higher than that employed heretofore. Thus, it was discovered that optimum yields of alkylate (based on the amount of olefinic materials introduced and on the amount of catalyst employed) may be obtained by controlling the above outlined recirculation of the reaction products and the rate of introduction of the isoparaffins and olefins so as to maintain the ratio between the isoparaffins and olefins to a value above about 20:1, and preferably within the range of between about 50:1 or 60:1 to about 200:1. As will be pointed out more fully below the yield of alkylate, when based on either the amount of olefins introduced into the system or the amount of catalyst employed therein, is quite low when operating in a continuous system and with the isoparaffin-olefin ratios taught by the prior art. It has now been discovered that these yields improve greatly with an increase in such ratio until a certain maximum is reached, after which any further increase in the ratio between the isoparaffins and olefins in the reaction zone has very little if any effect on the yield of alkylate whether based on the volume of olefins introduced or on the amount of catalyst employed in the system. Although experimental data has shown that under conditions wherein the control of recirculation of the reaction products and of the rates of introduction of isoparaffins and olefins to maintain the isoparaffin-olefin ratio above about 20:1, produces beneficial results and yields of alkylate which are considerably higher than those obtainable when operating according to the teachings of the prior art, the optimum and most economical ratios of isoparaffins to olefins are between about 50:1 and approximately 200:1.

It has also been discovered that the isoparaffin content in the reaction products being recycled has an important effect on the yield of alkylate fractions. Thus, when alkylating isobutane with olefins, the isobutane content in the reaction products being recycled should be above about 10%, and preferably between about 15% and 50%. As in the case of the ratio of isoparaffin to olefin, an increase in the isobutane content of the recirculation reaction product increases the yield of alkylate obtained until a point is reached above which a further increase in the isobutane content has very little effect on the yield of alkylate based either on the quantity of olefins introduced or on the acid employed as the catalyst.

The invention may therefore be stated to reside in a continuous process of alkylating isoparaffins with olefins in which a portion of the reaction products are recirculated and in which the rate of recirculation of this reaction product and the rates of introduction of isoparaffins and olefins are controlled so as to maintain the ratio of the paraffins to olefins within the reaction zone above about 20:1, and preferably within the range of between about 50:1 or 60:1 to about 200:1. The invention also resides in such continuous recirculation process in which the recirculation and feed rates are controlled so as to maintain the isobutane content at a value above about 10% by weight of the hydrocarbon phase, and more particularly within the range of between about 15% and 50%.

In one of its most specific embodiments the invention resides in a continuous process for alkylating low molecular weight isoparaffins with olefins, this process comprising commingling the isoparaffins and olefins with the products which have previously passed through the alkylation reaction zone, bringing this mixture into intimate contact with the alkylating catalyst and controlling the recirculation of the products of reaction and the rates of introduction of isoparaffins and olefins so as to maintain the ratio of isoparaffins to olefins in the alkylation reaction zone at a value of above about 10:1, and preferably within a range of between about 50:1 and 200:1. The invention also resides in the above described continuous process of alkylation wherein the rates of recirculation and of the isoparaffin introduction are further controlled so as to maintain the isoparaffin content, such as the isobutane content, at a value of above about 10% of the hydrocarbon phase, and more particularly between about 15% and 50% by weight of the hydrocarbon phase entering into the alkylation reaction zone.

For a better understanding of the various phases of the present invention reference is now made to the accompanying drawings in which:

Figure 1 is a diagrammatic elevational view of an embodiment in which the recirculated portion of the alkylate or reaction product is commingled with the hydrocarbons to be treated prior to the contact of this mixture with the alkylating catalyst, and, Figures 2 and 3 are graphic representations of certain data obtained during the alkylation of isoparaffins with olefins according to the process of the present invention and in an embodiment or structure presented diagrammatically in Figure 1.

Referring now to the drawings and particularly to Figure 1 thereof, there is shown a reaction chamber 10 which consists of two superimposed sections 11 and 12. The upper section 11 may be termed the settling chamber, while the lower section 12, which is shown to have a relatively smaller diameter, is the acid or catalyst chamber. The upper end of chamber 11 is provided with a discharge pipe 13, a branch line 14 extending from this pipe 13 to a pump 16. The discharge end of the pump opens into a line 17 which is provided with inlet lines 18 and 19 for the introduction of fresh quantities of isoparaffinic and olefinic hydrocarbons, respectively. Line 17 may also be provided with a cooler 21, the purpose of which will be discussed more fully hereinbelow. A mixer or similar commingling device 23 is attached to the discharge end of line 17, line 24 leading from the lower end of catalyst chamber 12 also opening into this mixer 23. A pipe 26 communicates the discharge end of mixer 23 with the lower portion of settling chamber 11. For purposes of discharging the contents of reaction chamber 10 as well as for the purpose of adding fresh quantities of catalyst, pipe 24 may be provided with a branch line 27 equipped with a valve 28.

The general operation of the above described structure is as follows, it being assumed that sulfuric acid is employed as the alkylating catalyst and that an isoparaffin fraction predominating in isobutane is to be alkylated. Before initiating the alkylation, reaction chamber 12 is filled with strong sulfuric acid catalyst, which is preferably of a concentration between about 96% and 100% sulfuric acid. The space above the acid is then filled with an alkylate fraction from a previous run or with the isoparaffinic fraction to be alkylated or with a mixture of these two fractions. Thereafter, pump 16 is caused to operate and simultaneously fresh quantities of isoparaffins and olefins are introduced into the system through lines 18 and 19, respectively. The mixture thus formed passes through cooler 21 wherein it is brought to the optimum temperature which in this case is in the neighborhood of 40° F. to 70° F., it being understood that specific temperature limitations presented herein are given only as an illustration and not for the purpose of limiting the invention. The hydrocarbon mixture is thus conveyed through mixer 23 wherein it is caused to be thoroughly and intimately commingled with the acid withdrawn from chamber 12 through line 24. The hydrocarbon-acid mixture is then conveyed through line 26 to settling chamber 11 in which the separation of the acid from the hydrocarbon phase occurs, the acid dropping down into chamber 12 while the hydrocarbon phase passes upwardly in chamber 11. The alkylation reaction occurs in mixer 23, line 26 and in the reaction chamber 10. Since the reaction chamber is completely filled with the hydrocarbon-acid mixture, and since both the isoparaffins and the olefins are maintained in a liquid phase in the system, the hydrocarbon phase passes continuously out of reaction chamber 10 into line 13. The rate of this discharge is proportional to the rate of introduction of fresh quantities of isoparaffins and olefins through lines 18 and 19, respectively. A portion of the hydrocarbon phase, equivalent to the olefins and isoparaffins added through lines 18 and 19, is withdrawn from the system through line 13, the balance being recycled through line 14, pump 16 and line 17 for further commingling with new quantities of isoparaffins and olefins as this will be more fully described below.

It is thus seen that the operations according to the process described above permits the regulation of the rates of isobutane and olefin introduction as well as the rate of recycling of the products of reaction leaving chamber 11 through line 13. When the ratio of isoparaffins to olefins is comparatively high, the products of reaction circulated through line 14 by means of pump 16 contain an appreciably quantity of unreacted isoparaffins, so that the rate of introduction of isoparaffins, such as isobutane, through line 18 is only equal to the quantity of isobutane withdrawn from the system through line 13, this isobutane being both in its unreacted form and as a reaction product with the olefins.

For the purpose of establishing the optimum ratios between the isoparaffin and olefin in the reaction zone as well as to determine the optimum percentage of isobutane in the hydrocarbon phase continuously fed into the reaction zone the following experiments were conducted in an apparatus similar to that described hereinabove.

In each of these experiments the reaction chamber 10 was first filled with five gallons of sulfuric acid having 98.1% $H_2SO_4$ concentration. Thereafter, the chamber was filled with an alkylate fraction from a previous run and the alkylation reaction was initiated by operating according to the process described hereinabove in which an isobutane containing fraction was continuously fed at a predetermined rate at line 18, an olefin containing fraction was introduced through line 19 and a portion of the alkylate fraction withdrawn through line 13 was continuously recycled through 14 by the operation of pump 16. In these experiments the isoparaffinic fraction employed comprised a narrow cut obtained from the stabilization of natural gasoline, and an analysis of this fraction indicated that it consisted of about 9.6% propane, 10.8% normal butane and 76.8% isobutane. It is obvious, however, that the isoparaffinic fraction to be alkylated according to the present invention may consist of hydrocarbons other than isobutane, such as isopentane or may comprise a mixture of these and other hydrocarbons The specific olefin-containing fraction employed was derived from petroleum cracking operations, and at substantially the following composition:

|  | Percent by volume of liquid |
|---|---|
| Ethane | 1.1 |
| Propylene | 10.6 |
| Propane | 26.0 |
| Isobutylene | 13.1 |
| Normal butylene | 10.0 |
| Isobutane | 20.4 |
| Normal butane | 18.8 |

It is thus seen that the above olefin-containing gas contained about 33.7 percent unsaturates, the ratio of propylene to the butylenes being about 1:2.3.

Five runs were made in each of which the olefinic fraction was introduced at the rate of about 1.19 gallons per hour while the recirculation rate and the rate of feed of the isobutane containing fraction were varied for the different runs so as to give various concentrations of isobutane in the circulating system as well as to produce various isobutane-olefin ratios in the alkylation reaction zone. The acid phase separated in chamber 10 was continuously recycled or circulated through line 24 at the rate of about 2.2 gallons per minute. The temperature was maintained at about 53° F. to 55° F. by controlling the temperature in cooler 21 on line 17. Each experiment was continued until the acid originally introduced into chamber 12 no longer promoted the alkylation reaction but favored polymerization of olefins. It was found that this point was reached when the acid phase showed an apparent $H_2SO_4$ content of about 80%. The acid phase was repeatedly tested and each experiment was terminated when the apparent $H_2SO_4$ concentration of the acid phase dropped to the above figure. The above apparent $H_2SO_4$ content of the acid phase corresponded to a point at which the alkylate fraction withdrawn through line 13 showed an olefin content of about 2%.

From the obtained yield of alkylates and the rates of introduction of isobutane and olefins, as well as from the rate of recirculation of the products recycled through lines 13 and 14, it was possible to calculate the various ratios presented graphically in the drawings, in which graph A of Figure 2 shows the percent yield of alkylate per volume of olefins plotted against the ratio mols of isobutane per mol of olefin in the reaction zone. Graph B of Figure 2 shows the volumetric yield of alkylate per volume of acid for the different ratios of isobutane and olefin in the reaction zone; while graphs C and D of Figure 3 show respectively the percent yield of alkylate per volume of olefins and the volumetric yield of alkylate per volume of acid catalyst plotted against the different percentages of isobutane in the circulated hydrocarbon phase.

A study of the curve presented in Figure 2 clearly indicates that, although an increase in the ratio of isobutane to olefin in a mixture entering into the reaction zone increases the alkylate yield both with respect to the quantity of olefins used or of the catalyst in the reaction zone, this increase in the alkylate yield is not a straight line function. Thus, both curves are S-shaped, the increase in the yield being relatively slow in the lower isoparaffin-olefin ratios then increasing rapidly until relatively optimum isoparaffin-olefin ratios are obtained, after which any further increase in the ratio effects the alkylate yield only to a relatively slight degree. For example, referring to the A curve it is seen that whereas the yield per volume of olefins increases rapidly as the ratio of isoparaffins to olefins is increased from about 20:1 to about 100:1, this increase in the yield gradually decreases and becomes comparatively negligible when the ratio exceeds for example 300:1. The same is true of curve B which shows that optimum yields (so far as the yield of alkylate per volume of acid is concerned) is obtained when the isoparaffinic-olefin ratio is in the neighborhood of about 50:1 to about 200:1.

Similarly, and referring more specifically to Figure 3 and graphs C and D thereof, the yields, whether based on the olefin or the acid increase considerably as the isoparaffin content in the circulating stream is increased, for example, from 15% to 50%, but is only negligible when such isoparaffin content is above about 60%.

It is to be noted that the above graphs are specific to isobutane and that they will vary slightly with the types of isoparaffins and olefins employed, nevertheless, the principle is the same although the ratios may be necessarily adjusted. Thus, if the olefin is a dimer, such as di-isobutylene, the relationship will not be the ratio of mols of isobutane per mol of olefin because the use of di-isobutylene will cause two molecules of isobutane to react with one mol of di-isobutylene.

It has been pointed out that optimum yields of alkylate are to be obtained by using very large excesses of isobutane or of a similar isoparaffin in the alkylation reaction zone. Obviously, the constant presence of this excess of isoparaffins causes the presence of such paraffins in the hydrocarbon phase removed through line 13. Further, the so-called crude alkylate fraction recycled through line 14 will contain considerable quantities of the unreacted isoparaffins, thus, requiring only small additions of fresh isoparaffin through line 18. Obviously, the fraction withdrawn through line 13 will contain both alkylate and unreacted isoparaffins which later may be easily separated from the alkylate as by fractionation and may be returned into the system through line 18.

Although the alkylation reaction between the isoparaffins of the type of isobutane, isopentane and isohexane and the normally gaseous or normally liquid olefins is not sufficiently exothermic to cause any marked temperature rise in the system, nevertheless, the operations of the above system cause a gradual heating of the hydrocarbons being treated. This heating may be either due to the mechanical energy introduced into the pumps or may be caused by heat evolved by the oxidation of some of the hydrocarbons by the sulfuric acid. Obviously, this heating may be due to other causes which are unkown at the present time. Whatever may be the cause of such heating, the alkylation of the above isoparaffins by the olefins in the liquid phase and in the presence of the sulfuric acid catalyst should preferably be realized at relatively low temperatures of the order of 40° F. to 70° F. It is for this purpose that line 17 is provided with cooler 21.

Although the above description was made in connection with the alkylation of the isoparaffins with olefins in the presence of a sulfuric acid catalyst, it is obvious that the process is not limited to a particular catalyst and that other catalysts which favor alkylation of isoparaffins may be employed. Thus, the catalyst may consist of a mixture of sulfuric and phosphoric acids, or may comprise chlorosulfonic acid or certain complexes of aluminum chloride or boron trifluoride. Again, the catalyst may consist of the above acids in combination with certain metallic salts, such as phosphates, sulfates, chlorides, nitrates, and acetates of metals of the type of cadmium, zinc, silver, mercury, copper, barium, etc. Similarly, it may be advisable to employ certain agents which will remove any water present or formed in situ, it being understood that the presence of water is undesirable, particularly when the acid catalysts are employed.

It is to be understood that the process is not limited to the chemical union of olefins and isoparaffins, but includes the alkylation of other hydrocarbons, such as aromatics. Also, the invention covers the cracking alkylation of aromatics and isoparaffins, this reaction including the step of reacting olefinic molecules with isoparaffinic or aromatic molecules to produce branched chain molecules having a molecular weight less than that which would be obtained if the reaction were of the simple addition type.

Wherever reference is made to the ratio between isoparaffins and olefins, it is intended to refer to the mol to mol ratio between said hydrocarbons.

Although the invention has been described in connection with the description of certain preferred embodiments, it is to be understood that there is no intention to be limited thereby, the invention being co-extensive with the scope of the appended claims.

I claim:

1. A continuous method for reacting isoparaffin hydrocarbons with monoolefins which comprises substantially completely filling a circulatory system partially with an acid-hydrocarbon mixture containing a normally liquid acid material capable of catalyzing the reaction and a substantial amount of said isoparaffin hydrocarbons, and the remainder of the system being substantially filled with said acid material substantially devoid of free hydrocarbons, circulating said materials to form a liquid stream with a velocity sufficient to induce turbulence thereinto, maintaining the acid-hydrocarbon mixture portion of said stream at a temperature suitable for the alkylation reaction, continuously separating from said stream at a point just behind said acid-hydrocarbon mixture portion substantially all of the gravity separable hydrocarbons of the reacted mixture, continuously withdrawing a portion of said hydrocarbons from the system and continuously returning the non-withdrawn portion of said hydrocarbons to said acid-hydrocarbon mixture portion together with a mixture of fresh feed including said isoparaffin hydrocarbon and monoolefin in such amount as to compensate for the hydrocarbons withdrawn from the system.

2. A continuous method for producing gasoline of high octane number by the reaction between isobutane and monoolefin which comprises substantially completely filling a circulatory system partially with an acid-hydrocarbon mixture containing concentrated sulfuric acid of alkylating strength and a substantial amount of isobutane, the remainder of the system being substantially filled with said acid substantially devoid of free hydrocarbons, circulating said acid-hydrocarbon mixture in liquid phase to form a stream with a velocity sufficient to induce turbulence thereinto, maintaining the acid-hydrocarbon mixture portion of said stream at a temperature suitable for effecting the alkylation reaction, continuously separating from said stream at a point behind said acid-hydrocarbon mixture portion the hydrocarbons of the reacted mixture, continuously withdrawing a portion of said hydrocarbons from the system, recovering gasoline from said withdrawn portion and continuously returning the non-withdrawn portion of said hydrocarbons to said acid-hydrocarbon mixture portion together with a mixture of fresh feed including isobutane and monoolefin in such an amount as to compensate for the hydrocarbons withdrawn from the system and to maintain a substantial molar excess of isobutane over the combined monoolefin in the system.

3. A continuous method for reacting isoparaffins with monoolefins which comprises establishing a circulating stream, part of which is an acid-hydrocarbon mixture containing said isoparaffin and a concentrated mineral acid capable of catalyzing the reaction, and the remainder of which is the said acid substantially devoid of free hydrocarbons, maintaining at least a substantial portion of the acid-hydrocarbon mixture part of said stream at a temperature suitable for the reaction, continuously separating the hydrocarbons of the reacted mixture at a point just ahead of the acid portion thereof, continuously withdrawing a portion of the said hydrocarbons from the system and continuously returning the non-withdrawn portion of said hydrocarbons to the acid-hydrocarbon mixture portion of said stream together with a mixture of said isoparaffin and monoolefin in such an amount as to maintain continuously the isoparaffin to olefin ratio of said stream at said point of return of at least 30:1 by volume.

4. A continuous method of producing gasoline of high octane number by reacting isoparaffin with monoolefin which comprises establishing a circulating stream, part of which is an acid-hydrocarbon mixture containing a low boiling isoparaffin and concentrated sulfuric acid of alkylating concentration for reacting isoparaffins with monoolefins, and the remainder of which is the said acid substantially devoid of free hydrocarbons, maintaining at least a substantial portion of the acid-hydrocarbon mixture part of said stream at a temperature suitable for the alkylation reaction, continuously separating the hydrocarbons of the reacted mixture at a point just ahead of the acid portion thereof, continuously withdrawing a portion of said hydrocarbons from the system and continuously returning the non-withdrawn portion of said hydrocarbons to the acid-hydrocarbon mixture portion of said stream together with a mixture of isoparaffin and monoolefin in such an amount as to maintain continuously an isoparaffin to monoolefin ratio of said stream at said point of return of at least 30:1 by volume.

5. A continuous method for producing gasoline of high octane number by the reaction between isobutane and monoolefin which comprises establishing a circulating stream, part of which is an acid-hydrocarbon mixture containing isobutane and concentrated sulfuric acid of alkylating strength, and the remainder of which is the acid substantially devoid of free hydrocarbons, maintaining at least a substantial portion of the acid-hydrocarbon mixture part of said stream at a temperature suitable for the alkylation reaction, continuously separating the hydrocarbons of the reacted mixture at a point just ahead of the acid portion thereof, continuously withdrawing a portion of the said hydrocarbons from the system, recovering gasoline from said withdrawn portion and continuously returning the non-withdrawn portion of said hydrocarbons to the beginning of the acid-hydrocarbon mixture portion of said stream together with a mixture of isobutane and monoolefin in such an amount as to maintain continuously an isobutane to monoolefin ratio of said stream at said point of return of at least 30:1 by volume.

6. A process according to claim 5 in which the isobutane to monoolefin ratio is at least about 50:1.

7. A process of producing alkylate from an olefin and an alkylatable hydrocarbon selected from the class consisting of isoparaffins and aromatics, which comprises alkylating said olefin and alkylatable hydrocarbon by contacting and agitating said olefin, alkylatable hydrocarbon and an alkylation catalyst, and maintaining the molecular ration of alkylatable hydrocarbon to olefin at the point where the olefin initially contacts the alkylation catalyst at least about 50:1.

8. A process of producing alkylate from isoparaffins and olefins which comprises alkylating an isoparaffin with an olefin by contacting and agitating the olefin, isoparaffin and an alkylation catalyst, and maintaining the molecular ratio of isoparaffin to olefin at the point where the olefin initially contacts the catalyst at least about 50:1.

9. A process according to claim 8 in which said ratio is maintained by employing an excess of isoparaffin to olefin in the feed and recycling a portion of the reaction product containing alkylate and unreacted isoparaffin.

10. A process of producing alkylate from isoparaffins and olefins which comprises alkylating an isoparaffin with an olefin by contacting and agitating the olefin, isoparaffin and concentrated sulfuric acid catalyst and maintaining the molecular ratio of isoparaffin to olefin at the point where the olefin initially contacts the sulfuric acid catalyst at least about fifty to one.

11. A process of producing alkylate from isobutane and butylene which comprises alkylating isobutane with butylene by contacting and agitating said butylene, isobutane and concentrated sulfuric acid catalyst and maintaining the molecular ratio of isobutane to butylene at the point where the butylene initially contacts the catalyst at least about fifty to one.

12. A process according to claim 11 in which the molecular ratio of isoparaffin to olefin is about 100:1.

13. In a process for the alkylation of an isoparaffin with an olefin in the presence of an alkylation catalyst, wherein the isoparaffin and the olefin are continuously fed to the alkylation system and contacted therein with the catalyst under alkylating conditions to produce alkylation reaction products, and the reaction products are settled to separate a catalyst phase from an alkylate phase, the improvement which comprises prediluting the olefin feed to the alkylation system with separated alkylate phase prior to contacting the said olefin with the catalyst.

14. In a process for the alkylation of an isoparaffin with an olefin in the presence of an alkylation catalyst, wherein the isoparaffin and the olefin are continuously fed to the alkylation system and contacted therein with the catalyst under alkylating conditions to produce alkylation reaction products, and the reaction products are settled to separate a catalyst phase from an alkylate phase containing a high proportion of isoparaffin, the improvement which comprises prediluting the olefin feed to the alkylation system with separated alkylate containing a high proportion of isoparaffin prior to contacting the said olefin with the catalyst.

15. A process according to claim 14 in which a portion of the separated catalyst phase is recycled to the alkylation system.

16. In a process for the alkylation of an isoparaffin with an olefin in the presence of an alkylation catalyst in a zone maintained under alkylating conditions including the maintenance in said zone of a substantial molar excess of isoparaffins to olefin, and wherein alkylation reaction products are separated into a catalyst phase and an alkylate phase containing a high proportion of isoparaffins, the improvement which comprises maintaining in part the said substantial molar excess of isoparaffins to olefins by prediluting the olefin with previously formed and separated alkylate containing a high proportion of isoparaffins prior to introducing said olefin into the said zone in contact with the catalyst.

17. A process according to claim 16 in which the alkylate phase is divided to form two portions having substantially the same composition, and one of these portions is employed for the said prediluting of the olefin, and the other of said portions is removed from the system for recovery of alkylate therefrom.

18. A process according to claim 16 in which the olefin has no more than about 12 carbon atoms.

19. In a process for the alkylation of an isoparaffin with an olefin in the presence of an alkylation catalyst, wherein a charge of isoparaffin and olefin is continuously fed into an alkylation reaction zone and contacted in said reaction zone maintained under alkylating conditions with the alkylation catalyst such that isoparaffin is alkylated with olefin to produce alkylate, the improvement which comprises continuously introducing into the said reaction zone concomitantly with the said charge of isoparaffin and olefin a substantial proportion of previously formed alkylate substantially free from alkylation catalyst in such manner that the said olefin is mixed with and diluted by the said alkylate prior to contacting of the olefin with the said alkylation catalyst.

20. In a process for the alkylation of an isoparaffin with an olefin in the presence of strong sulfuric acid of alkylation strength, wherein the isoparaffin and the olefin are continuously fed to the alkylation system and contacted therein with the acid under alkylating conditions to produce alkylation reaction products, and the reaction products are removed and settled to separate an acid phase from a hydrocarbon phase containing a high proportion of isoparaffins, the improvement which comprises prediluting the olefin feed to the alkylation system with separated hydrocarbon phase containing a high proportion of isoparaffins prior to contacting the said olefin with the acid.

21. A process according to claim 20 in which the isoparaffin is isobutane and the olefin is a normally gaseous olefin.

22. A process according to claim 10, in which the alkylation is carried out at a temperature between about 40° F. and 70° F. with both the olefin and the isoparaffin substantially in the liquid phase.

WILLIAM E. BRADLEY.

REFERENCES CITED

The following references are of record in the file of this patent:

UNITED STATES PATENTS

| Number | Name | Date |
|---|---|---|
| 2,001,910 | Ipatieff | May 21, 1935 |
| 2,169,809 | Morrell | Aug. 15, 1939 |
| 2,233,363 | Frey et al. | Feb. 25, 1941 |
| 2,271,860 | Goldsby | Feb. 3, 1942 |
| 2,283,603 | Goldsby et al. | May 19, 1942 |
| 2,296,511 | Frey et al. | Sept. 22, 1942 |

FOREIGN PATENTS

| Number | Country | Date |
|---|---|---|
| 479,345 | Great Britain | Jan. 31, 1938 |
| 824,329 | France | Nov. 10, 1937 |
| 486,355 | Great Britain | June 2, 1938 |
| 839,280 | France | Dec. 26, 1938 |

OTHER REFERENCES

J. A. C. S., Sept. 1935, pages 1616 to 1621. 196–10.

Certificate of Correction

Patent No. 2,435,029.   January 27, 1948.

WILLIAM E. BRADLEY

It is hereby certified that errors appear in the printed specification of the above numbered patent requiring correction as follows: Column 6, line 3, for the word "appreciably" read *appreciable*; line 35, for "76.8%" read *79.6%*; column 10, line 61, claim 7, for the word "ration" read *ratio*; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*